Dec. 5, 1950 J. H. HOMRIGHOUS 2,532,719

DIMENSIONAL RADIO COMMUNICATION SYSTEM

Filed Oct. 16, 1944 4 Sheets-Sheet 1

INVENTOR.

John H. Homrighous

Dec. 5, 1950 J. H. HOMRIGHOUS 2,532,719

DIMENSIONAL RADIO COMMUNICATION SYSTEM

Filed Oct. 16, 1944 4 Sheets-Sheet 2

INVENTOR.

John H. Homrighous

Dec. 5, 1950 J. H. HOMRIGHOUS 2,532,719

DIMENSIONAL RADIO COMMUNICATION SYSTEM

Filed Oct. 16, 1944 4 Sheets-Sheet 3

INVENTOR.

John N. Homrighous

INVENTOR.
John H. Homrighous

Patented Dec. 5, 1950

2,532,719

UNITED STATES PATENT OFFICE 2,532,719

DIMENSIONAL RADIO COMMUNICATION SYSTEM

John H. Homrighous, Oak Park, Ill.

Application October 16, 1944, Serial No. 558,931

56 Claims. (Cl. 250—9)

This invention relates to a radio communication system and more particularly to a time division multiplex radio phone communication system.

One of the main objects of my invention is to provide means whereby a plurality of private two-way conversations may be transmitted intermittently in time relation over carrier waves of like frequencies.

Another object of my invention is to provide means in a radio communication system whereby any station may signal or call a second station exclusive of any other stations in the system.

Another object is to provide an improved station numbering scheme whereby to call radio stations in one group assigned one digit, two digit or three digit numbers may be used, and to call a station in another group a prefix letter may be used.

Another object is to provide means for developing synchronizing control signals for controlling the hundred, ten and unit selection of a called number.

Another object of my invention is to provide means for utilizing received control signals for selecting from a group of stations and desired station to receive a communication.

Another object is to provide means at each station for transmitting a carrier wave during the time that is allotted to the called station to receive a message.

Another object is to provide in a group of radio stations means for signaling between different pairs of stations in successive rotation over a common transmission lane and for thereafter transmitting different messages between the different pairs of signaled stations through the same transmission lane.

Another object is to provide message condensing and expanding mechanism comprising a cathode ray tube provided with two electron rays directed toward different screens in the tube and deflected at different frequencies so that a message may be stored at one frequency and reproduced at a much higher frequency and vice versa.

Another object of my invention is to provide in a radio station means for transmitting a message intermittently during equal alternate periods of time and for receiving a message intermittently during equal intermediate periods of time.

Another object is to provide a method for separating a unit of time into several smaller sub-units, and further dividing each sub-unit into a plurality of equal periods of time, each period being for a different message.

Another object is to provide means at each station for transmitting a radio frequency carrier wave intermittently during periods of time different from the transmission time of any other station in the group.

Another object of my invention is to provide means at each station for the reception of carrier waves intermittently during periods of time different from the reception time of any other station in the group.

Another object of my invention is to provide for at least one carrier wave common to all areas in the system for special service facilities, such as connection to telephone office stations, fire and police stations, which stations may have the same call numbers in all areas so that mobile radio stations as well as other radio stations may have access to telephone subscribers or emergency stations.

Another object of my invention is to provide groups of radio stations comprising ten station or party groups, one hundred station groups and one thousand station or party groups for two-way messages between any pair of stations in a group, and also for two-way messages between stations in different groups.

Another object is to provide improved means for actuating at a distant station one or more relays over a single carrier wave for remote control purposes.

Still another object is to provide an improved double cathode ray tube for condensing and expanding message signals, or stated in another way, the cathode ray tube may be provided with one screen for storing the message at one frequency and a second screen for reproducing the message at a different frequency.

Message in this specification is to be understood to include any intelligence or any portion of any intelligence representative of voice controlled electrical signals, or telegraph or other coded electrical signals.

A channel in this specification is to be understood as a one-way path for the transmission of electrical signals between two stations in spaced periods of time and may be one of a number of carrier wave channels or part time channels in a transmission path or lane for the transmission of electrical signals representative of a number of messages between a number of pairs of stations.

The radio system of the instant invention comprises a plurality of stations so arranged that communication may be had simultaneously and on the same wave length between several pairs of stations. One wave length may be employed for a group of any number of stations up to one thousand. Another wave length may be employed for calling stations in another group of a thousand stations, and at least one wave length may be employed in all areas for such service as connecting to telephone subscribers so that mobile equipment may be able at all times to call a telephone office.

The stations transmit messages intermittently, or stated in another way, a message from one station may be transmitted during a certain period of time and a message from a second radio station may be transmitted during a different period. No two stations in the same group transmit during the same period of time. Likewise the receivers in each station may be arranged to receive signals only during certain predetermined periods, which also determine the station identification or number.

The message selector and distributor comprises a saw-tooth generator and means for selecting suitable potential values of each saw tooth voltage wave to divide the interval for each wave into a plurality of periods of time so that a number of individual messages, one message for like periods in successive waves, may be transmitted in rotation through a common transmission path or lane.

This invention is an improvement over my prior communication system shown in application Serial No. 472,105, filed January 12, 1943, now Patent No. 2,437,027, issued March 2, 1948, which describes a system for transmitting several one way messages over a single carrier wave.

The instant invention, so far as is known, shows the only selective radio system for signaling or calling over a single transmission path any radio station in a group by the station's assigned number, independently of other stations in the group.

In my prior application Serial No. 350,758, filed August 3, 1940, now Patent Number 2,369,783, issued March 20, 1945, I show a selective system whereby a single station in a group may be selected by first signaling a number of stations then causing all stations except the desired station to be deenergized.

In this invention I employ high or ultrahigh frequency carrier waves amplitude modulated; however, it is to be understood that the principles involved may be equally applicable to micro waves, and to frequency modulation.

Other objects and advantages of my invention will appear from the following description, taken in connection with the accompanying drawings in which.

Figures 1, 2, 3, 4, 5, 6:
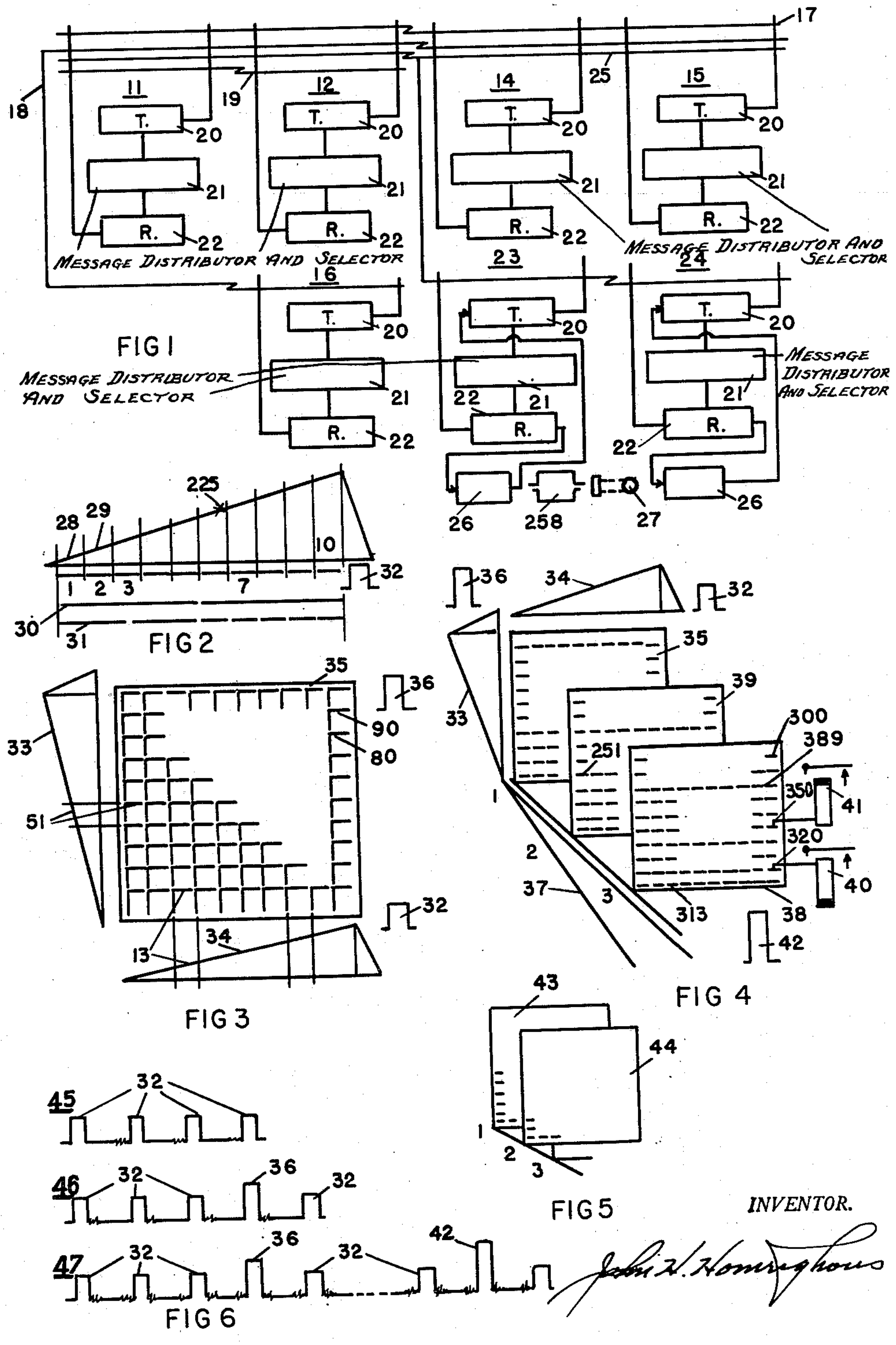
Figure 1 is a diagrammatic illustration of a radio system comprising a plurality of groups of radio stations.
Figures 2, 3, 4 and 5 are diagrammatic illustrations of numbering schemes for selective radio communication systems.
Figure 6 is a diagrammatic illustration of control signals.

Figure 1 shows a plurality of radio stations each comprising a transmitter and a receiver for the transmission and reception of message signals over carrier wave channels through a common transmission lane in different intermittent periods between different pairs of stations in a group. Stations in other groups may be signalled over other carrier wave channels. Several stations may call or signal other stations over carrier waves of like frequency during different intermittent periods of time.

Figure 2 illustrates the division of a saw tooth wave into different parts for identifying each radio station in the group and the time allotted for each message.

Figure 3 illustrates an arrangement for assigning and associating two digit numbers to a larger group of stations. This arrangement utilizes two saw tooth waves each divided into ten parts and shown at right angles to each other, forming a frame to diagrammatically indicate the periods of time allotted to each individual station. The horizontal saw tooth waves, are ten times the frequency of the vertical saw tooth waves so that the combination of the ten divisions horizontally and the ten divisions vertically will give one hundred separate divisions or one hundred two digit station numbers.

Figure 4 illustrates an arrangement or block diagram for assigning and associating three digit numbers to a much larger group of stations. This scheme utilizes three saw tooth waves, each divided into ten parts and arranged in a three dimension block diagram to diagrammatically indicate the periods of time allotted to each individual station. The horizontal and vertical waves form frames of one hundred station numbers, each frame being similar to the frame described in connection with Figure 3. The third dimension or block wave which is divided into ten parts may separate the several frames as shown. The ratio of the frequencies for the three waves is as follows: for each block wave there are ten vertical or frame waves and one hundred horizontal or line waves, so that the combination of the divisions in the three waves will give one thousand separate divisions or one thousand three digit station numbers; that is, one hundred stations for each of the ten frames.

Figure 5 illustrates another block diagram for another group of one thousand stations similar to Figure 4, but having a different prefix letter or character for the three digit station numbers.

Figure 6 illustrates diagrammatically the line, line and frame, and the line, frame and block control signals for the three groups of stations illustrated in Figures 2, 3 and 4.

Figure 7:
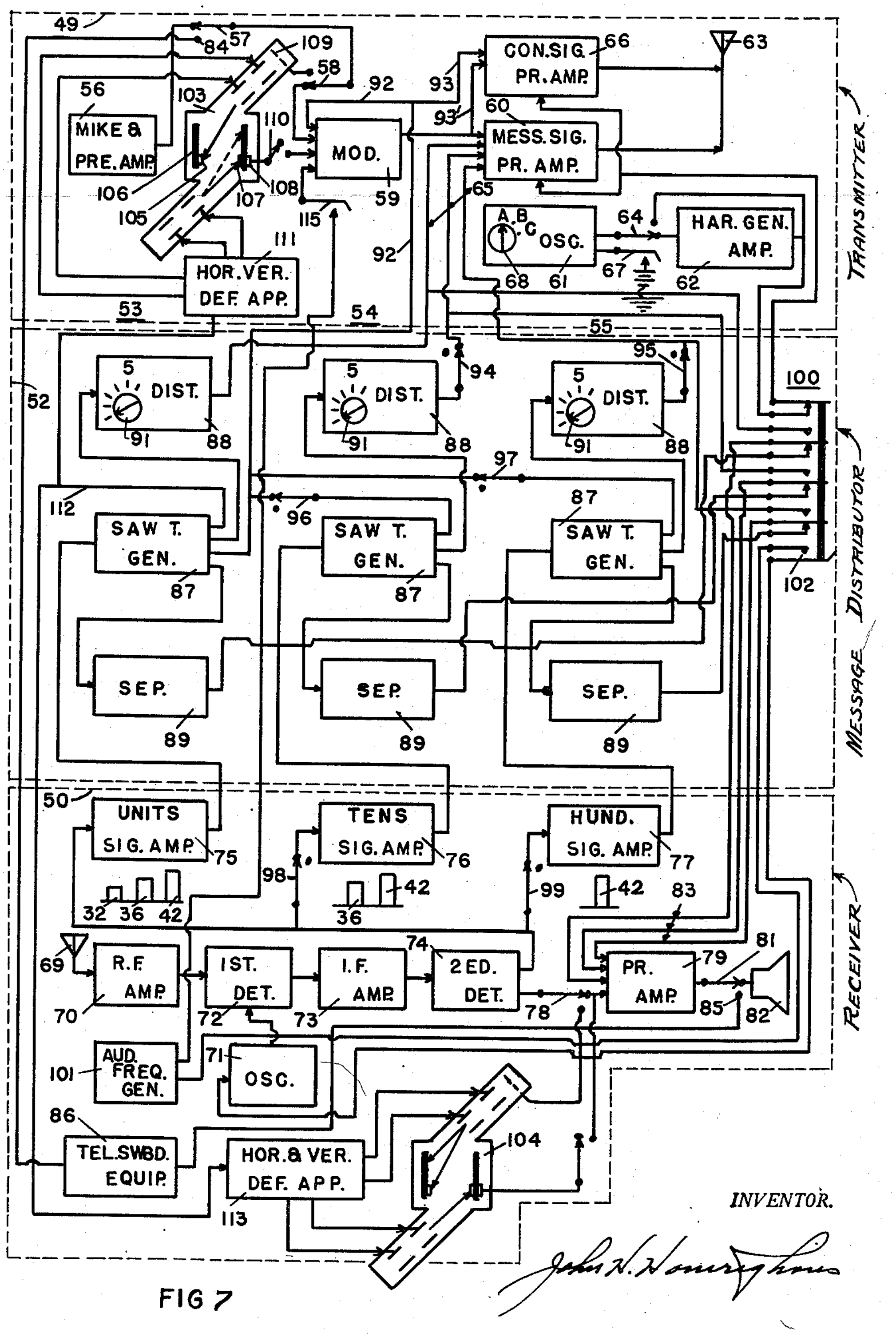
Figure 7 is a block and circuit diagram of a radio station.

Figure 7 shows a block diagram of a radio transceiver or transmitter and receiver which may be similar to any of the stations shown in Figure 1. This station is arranged to signal another station or transmit a message or fragments of a message during spaced periods of time and to receive a message or fragments of a message during different spaced periods of time. This station may be used in a single dimension or a two to ten station system, a two dimension or a one hundred station system, and a three dimension or a one thousand station system. Each station transmits and receives signals during different periods of time, and each station in a group may be assigned a definite number which determines the period that the station is capable of reproducing received signals representative of a message. Each station is provided with a saw tooth generator, message distributor and a message separator for each digit in the station number to control the transmitting and receiving periods. Control signals are developed and transmitted at the calling station to synchronize the saw tooth waves produced at the called station with the saw tooth waves produced at the calling station.

There may be provided at both the transmitter and the receiver a double cathode ray tube arranged to change the frequency of message signals when it is desirable to have a high quality of reproduction.

The frequency of oscillations produced at the transmitter may be changed when it is desired to call a station in a foreign group. The dial reading at the oscillator may be marked with a letter known as the prefix character in the station number.

Figure 8:
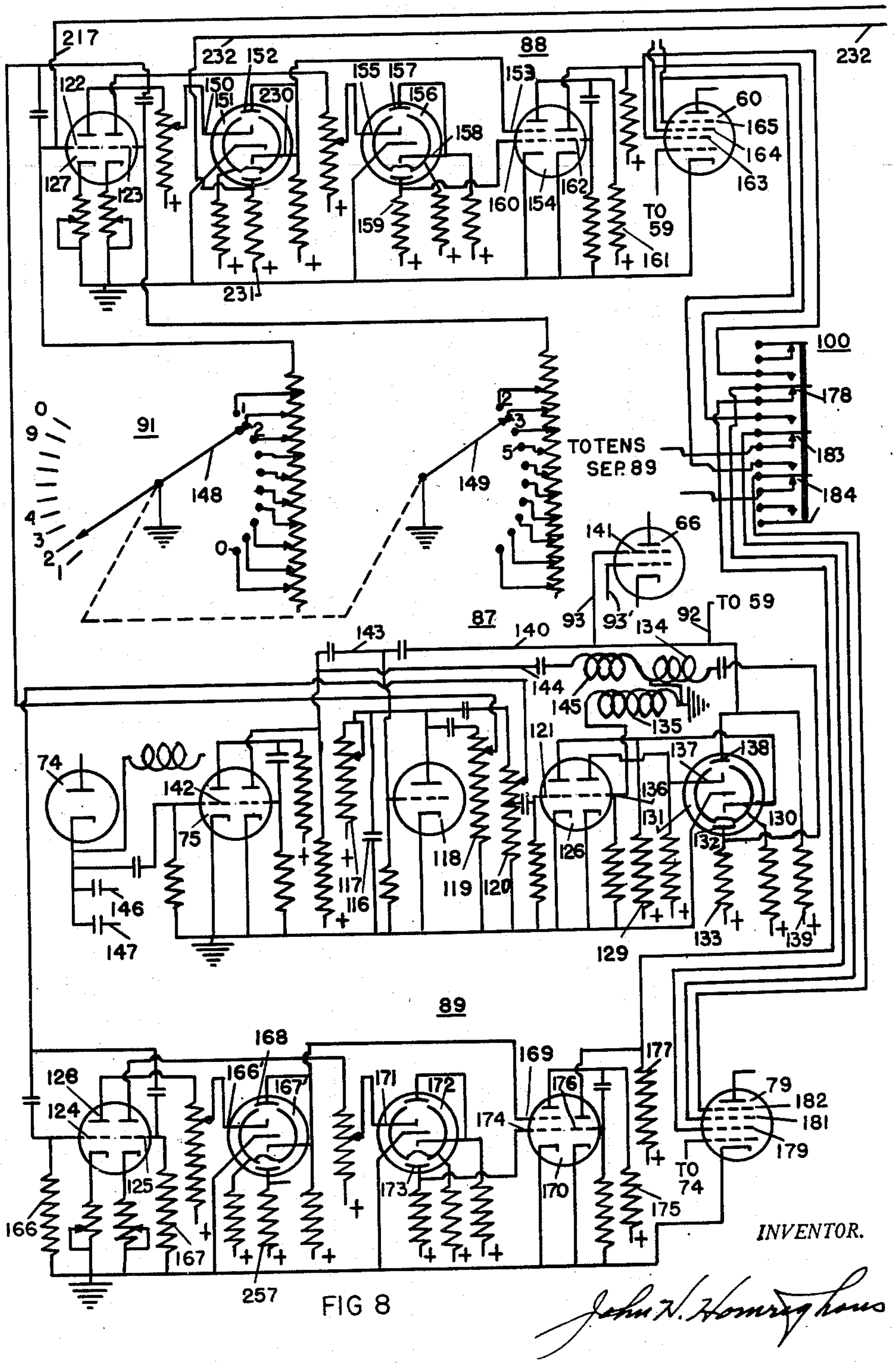
Figure 8 is a circuit arrangement that may be used with the radio station of Figure 7.

Figure 8 shows apparatus and associated circuits used in the radio station of Figure 7 to produce a series of saw tooth waves to determine the period of time for transmitting a carrier wave and for separating or selecting the period of time for reproducing received signals. Control signals or impulses may be developed and supplied to the modulator.

Figure 9:
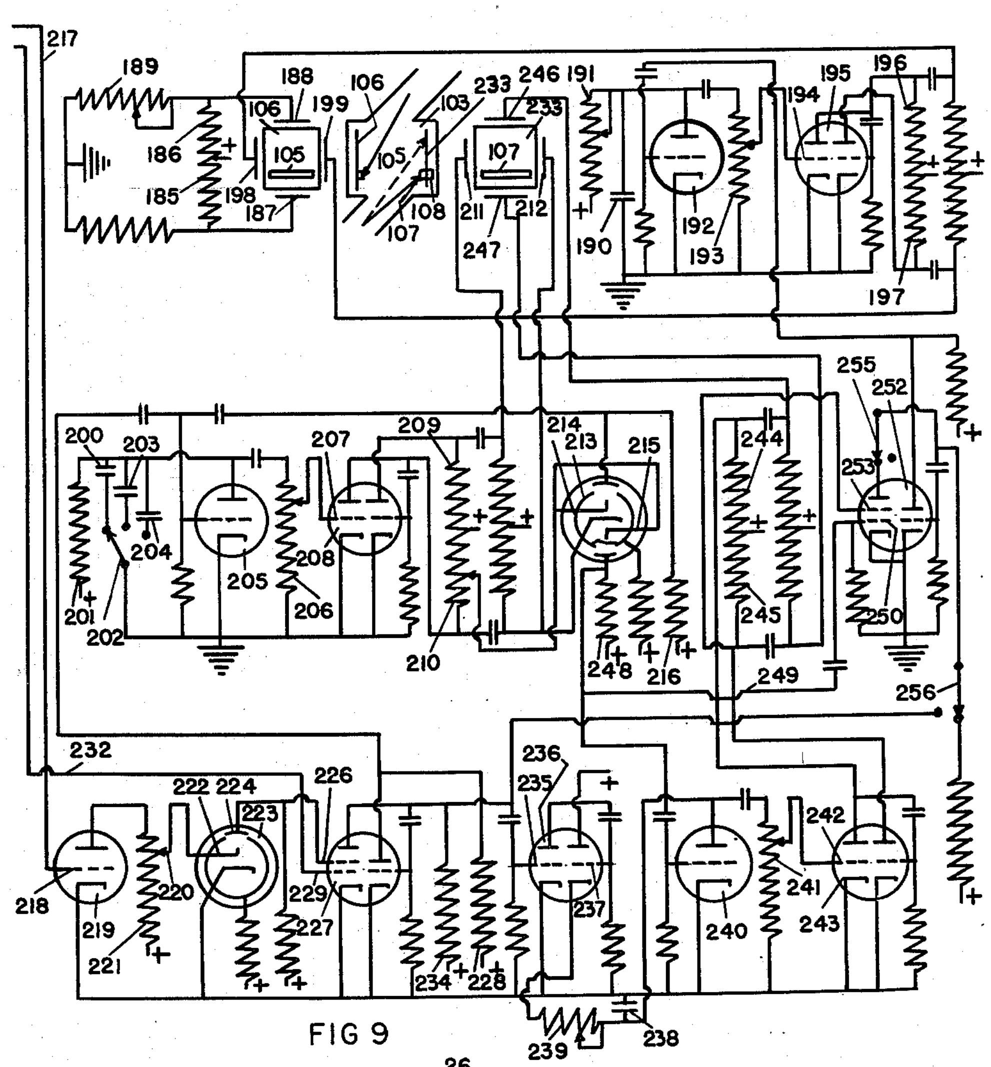
Figure 9 is a circuit arrangement for changing the frequency of message signals.

Figure 9 shows a double cathode ray tube and associated circuits for changing the frequency of signals by recording the signals on one screen and reproducing the signals from the second screen at a different rate. For instance, in a ten party system the ratio of horizontal scanning would be one line on the first screen to ten lines on the second screen with only the tenth line being effective to record or reproduce signals.

Figure 10:
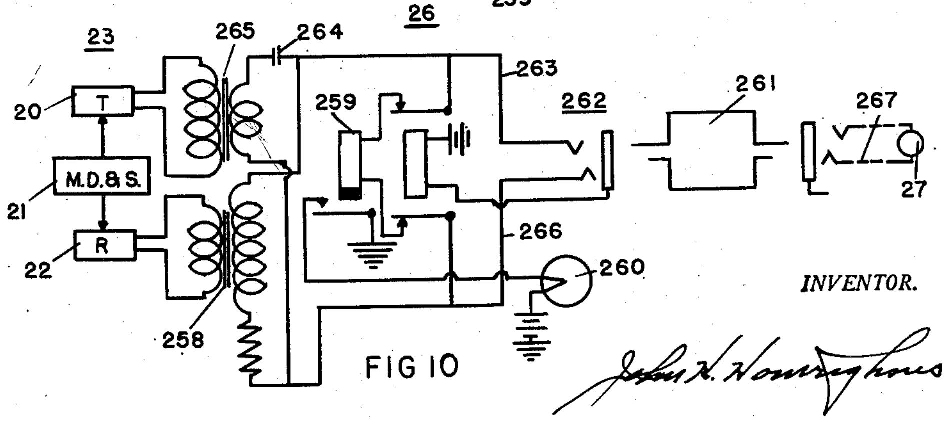
Figure 10 is a circuit arrangement for terminating a radio station at a telephone switchboard.

Figure 10 shows a radio station provided with telephone switchboard equipment for a telephone office or special service switchboards for emergency calls.

Refer again to Figure 1 which diagrammatically illustrates several radio stations, 11, 12, 14 and 15 in a group which may comprise any number up to one thousand radio stations. Other similar groups of one thousand stations or smaller groups (one station in another group shown at 16) may be accessible to any one of the stations. Any station 11, 12, etc. in a group may signal any other station in the same group over a carrier wave transmission channel illustrated by the line 17. Any station in the group such as station 11 or 12 may call any station such as station 16 in another group of stations or vice versa over another carrier wave channel as illustrated by the line 18. Station 11 may call station 12 or vice versa over a carrier wave channel as illustrated by the line 19.

The carrier waves transmitted by the several stations in a group for signaling and talking between stations in the same group may be of like frequencies, but transmitted at different periods of time. Two-way conversation between pairs of stations may be over two one-way channels to be more fully explained later.

The individual stations may all be similar to each other and comprise a transmitter 20, message selector and distributor 21 and receiver 22. The transmitter 20 transmits messages intermittently, or in other words a message from one station may be transmitted during a certain period and a message from a second station may be transmitted during a different period, no two stations transmitting during the same period of time. Likewise the receivers 22 may be arranged to reproduce received signals only during certain predetermined periods which also determines the station identification or number, to be fully explained later. The message selectors and distributors 21 comprise saw tooth generators with means to divide the saw tooth waves produced into different parts to control the transmitting and receiving periods.

The stations 23 and 24 may be accessible over a different carrier wave channel illustrated by the line 25. These stations may be similar to the other stations except that they terminate in two telephone switchboards 26. Station 23 may be in a telephone office and may be accessible to telephone subscribers, one telephone station being indicated at 27. Station 24 may be a special service or emergency station located in a police or fire station. Any of the stations other than stations 23 and 24 may be located in mobile devices.

The saw tooth wave shown in Figure 2 illustrates one of a series that may be produced in any of the radio stations shown in Figure 1 for allotting periods of time for the transmission and reception of message signals. This wave and all succeeding waves in the series may be divided into ten parts as indicated at 28 and 29 or the short horizontal marks 1, 2 and 3 through 10 may indicate the radio station numbers and also the portion of the elapsed time in each saw tooth wave allotted to each message.

In small groups of radio stations, from two to ten stations, only one series of saw tooth waves may be produced to control the selection of the proper period of time for each message. Each station in the group would be assigned a number corresponding to the period of time in a series of saw tooth waves that the particular station may be capable of reproducing a message from received signals. Each station may call any other station in the group by transmitting a modulated carrier during and only during the period of time in the series of saw tooth waves assigned to the called station for receiving a message. Two stations only may be employed for communication purposes with each station having equal periods of time for transmitting and receiving message signals in each saw tooth wave as indicated by the two marks in line 30, or unequal periods of time may be assigned to the several stations in a group as shown by the marks in line 31.

Spaced control signals or line control signals, one signal being illustrated at 32, may be produced and transmitted to keep the saw tooth waves at a called station in step with the saw tooth waves at the calling station.

With further reference to Figure 3, this figure illustrates a diagrammatic arrangement for assigning two digit numbers to a large group of radio stations, by utilizing two saw tooth waves, one ten times the frequency of the other to select different periods of time for each station in a one hundred station group or a two dimension radio system. One saw tooth wave is shown vertically at 33 and the other wave is shown horizontally at 34. By dividing each wave into ten parts as indicated by marks such as at 13 and 51 and assuming that the horizontal frequency is ten times the vertical frequency, we may consider that ten horizontal waves produced ten equally spaced lines in the frame diagram 35. An analogy to this is the scanning action over a cathode ray tube screen. Since each horizontal line is divided into ten equal spaces and there are ten lines in each frame, we may obtain one hundred two digit numbers.

The location of each number in the frame may be considered as indicating the period of time during which the assigned station may be capable of reproducing a message from received signals.

The first or tens digit of any 2 digit number in the frame is the number of the line counting from bottom up and the unit digit is the space in the line counting from left to right; thus 13 is in line one, space three as shown. And the number 51 would be line five, space one as shown, and number 03 would be top line, space 3.

Numbers such as 80 and 90 may be assigned in each group of one hundred stations for telephone and fire or police stations.

Line and frame control signals are illustrated at 32 and 36. These reoccurring control signals or impulses are transmitted between stations to control the development of line and frame saw tooth waves.

With further reference to Figure 4, I have illustrated diagrammatically another arrangement for assigning calling numbers comprising three digits to radio stations in groups having a greater number of stations. This arrangement is somewhat similar to that shown in Figure 3 with the exception that another saw tooth wave 37 may be added for the third dimension. This third dimension or block wave 37 may be divided into ten equal parts to provide spacing for ten frames which may be known as a three dimension radio communication system. The ratio of frequency between the three saw tooth waves is as follows: for each block wave 37 there are ten successive vertical waves 33, and one hundred successive line waves 34. Thus ten frames of one hundred station numbers each will provide a total of one thousand three digit numbers. The location of the number in the block diagram may be considered as indicating the periods of time that a particular station may be capable of receiving messages, in each three dimensional figure or block diagram, or during each block saw tooth wave 37. The third or hundred digit is obtained from the frame location reading from the lower left corner of the diagram as indicated by the numerals 1, 2 and 3. The second or tens digit in a station number may be obtained from the line location in a frame counting from bottom up. The units digit in a station number may be obtained from the space in a line counting from left to right. Thus the number 313 would be found in the third frame 38, first line, and the third space in the line. The number 251 is found in the second frame 39, fifth line and first space. Numbers 320 and 350 may indicate station numbers assigned for the control of slow-acting relays 40 and 41. Number 389 may be called to obtain information such as weather reports. Telephone offices may be assigned number 300 which may be found in the third frame tenth or naught space in the top line. Block control signal is illustrated at 42, the line and frame signals are illustrated at 32 and 36.

The stations in the group as illustrated in the diagram of Figure 4 may all be signaled through a single transmission lane, or any station in a group may call any other station in the same group over a single carrier wave channel by three digit numbers. Should it be desired to call a station or stations in other groups, then it becomes necessary to assign a prefix letter to each separate group of radio stations, which letter would signify the particular carrier wave to be selected. Thus the station numbers in Figure 4 may all have the letter A as a prefix character.

Figure 5 shows two frames 43 and 44 in a second group of one thousand stations; the radio station numbers in this group may have a letter B as a prefix character which would signify a carrier having a wave length different than the wave length assigned to other groups having different prefix characters.

With further reference to Figure 6, I have shown diagrammatically three sets of control signals for controlling or timing the development of saw tooth waves in the three groups of stations described above. The first set of control signals at 45 comprises a series of equally spaced line control signals 32, all of which are of equal height or amplitude, and are for keeping saw tooth waves produced at the stations in a single dimension group in synchronism. The second set of control signals at 46 is equally spaced but of different height. The line control signals 32 are similar to those in set 45. The frame signal represented at 36 is of greater amplitude and appears between groups of line control signals. This set of control signals is for synchronizing the station devices in a two dimension radio station group. The third set of control signals at 47 comprises three different types of signals: line signals 32, frame signals 36 described above, plus block signals 42 which are of greater amplitude than the frame signal 36, and occur at the termination of each block wave. This set of control signals is for synchronizing the station devices in a three dimension radio station group.

Refer to Figure 7, illustrating diagrammatically a radio station that may be any one of the stations in Figure 1, and may comprise a transmitter 49, and a receiver 50 with a message distributor and selector 52 for controlling the transmitter and receiver. The transmitter in each station may transmit modulated carrier during any period depending upon what station is called. Saying it another way, the receivers in the different stations are only capable of reproducing messages during a predetermined period of time according to the number assigned to the station, therefore, each station must be able to transmit intermittently messages during any selected period.

The message distributor and selector may be divided into units equipment 53, tens equipment 54, and hundreds equipment 55.

The numeral 56 designates a microphone and preamplifier where message signals are developed and fed through switches 57 and 58 to the modulation amplifier 59. From the amplifier 59 the signals are supplied to the message signal power amplifier 60. Electrical oscillation may be produced by the oscillator 61 and fed to the harmonic generator and amplifier 62 for increasing or multiplying the frequency of the oscillations developed in 61 to provide a carrier wave in the ultra high frequency region or band. In the power amplifier 60 this carrier wave is modulated by the message signals from amplifier 59 and fed to the antenna 63. A carrier wave of relatively low frequency may be developed in the oscillator 61 and fed through switch contact 64 to the power amplifier 60. The message signal power amplifier 60 may be blocked from supplying a carrier wave to the antenna except for a relatively short recurring period by electrical conditions produced in the units, tens, and hundreds equipment supplied through the connections 65. The period in which a carrier wave is supplied to the antenna depends upon the station number called. Only relatively short recurring periods of time are assigned to any one station for the reception of signals.

The oscillator 61 or the generator 62 may supply the same carrier wave to the control signal power amplifier 66. This amplifier is blocked to message signals and supplies a carrier wave only to the antenna 63 during periods between message signals when control signals may be developed in the units, tens, and hundreds equipments. The key 67 is for energizing the oscillator after it has been determined that the called station is not busy. The dial 68 may be rotated to markings A, B and C to tune the oscillator to produce carrier waves having different frequencies.

The antenna 69 receives carrier signals from calling stations which signals are fed to a radio frequency amplifier 70; an oscillator 71 reacts with these signals in the first detector stage 72 on the heterodyne principle to produce an intermediate frequency which is supplied to the intermediate frequency amplifier 73. After suitable amplification the message signals and control signals are demodulated at 74. The control signals being of greater amplitude are separated and fed to the units, tens and hundreds signal amplifiers 75, 76 and 77 to control or synchronize the saw tooth wave generators in the message distributor and selector 52. The message signals are fed from the second detector 74 through the switch 78 to the power amplifier 79. The output of the power amplifier is intermittent, and the output is supplied through the switch 81 to the loud speaker 82. As stated above the transceiver or station number determines the period of time that the receiver is capable of receiving a message from the loud speaker; therefore, the power amplifier 79 may be blocked by electrical conditions produced in the units, tens and hundreds equipment supplied through the connections 83 during all periods except the period corresponding to the assigned number. This arrangement is fixed for each station so that only the signals intended for a particular station are supplied to its associated speaker.

Should the transceiver shown in Figure 7 be employed in a telephone office or terminate in a telephone switchboard, then switches 57 and 81 would be rotated to contacts 84 and 85, disconnecting the microphone 56 and loud speaker 82 and connecting the telephone switchboard equipment 86 to the transceiver so that telephone subscribers may be accessible to a group of radio stations.

The message distributor and selector 52 may comprise three sets of equipment 53, 54 and 55 one set for each digit in the station numbers. In a one dimension or ten party system only the units equipment 53 would be employed. In a two dimension or one hundred party system the units equipment 53 and tens equipment 54 would be employed, and in a three dimension or one thousand party system all three equipments 53, 54 and 55 would be employed.

In the three sets of equipment 53, 54 and 55 like numerals represent similar apparatus. The saw tooth generators 87 may each produce a series of saw tooth voltage waves. The units generator 87 produces line saw tooth waves, tens generator 87 produces frame or second digit saw tooth waves, and hundreds generator 87 produces block or third digit saw tooth waves. As stated above the ratio of frequency is as follows: for each block wave there are ten frame waves and one hundred line waves. The saw tooth voltages from the generators 87 are supplied to the distributors 88 and the separators 89. In the distributors 88 the saw tooth potentials, may through the operation of the switch dials 91 to the number of a desired station, control the potential over the connections 65 to the power amplifier 60, thereby controlling or selecting recurring periods in a series or a number of related series of saw tooth waves during which the station may transmit signals to the called station. In the separators 89 the saw tooth potentials may be utilized to control the potential over the connections 83 to the power amplifier 79, thereby selecting recurring periods in a series or a number of related series of saw tooth waves for reproducing the proper portion of the received signals intended for the loud speaker 82 in an associated station.

Received control signals are amplified in the amplifiers 75, 76 and 77 and applied to the saw tooth wave generators 87 to trigger the generators or to restore the potential of the saw tooth waves to approximately zero value. The units signal amplifier 75 is biased so that message signals will not alter the current output, but the amplifier may amplify all three control signals line 32, frame 36, and block signals 42, each of which triggers the units saw tooth generator 87 to cause the potential of a units saw tooth wave to be reduced to the starting point for another wave. Therefore in a three digit system at the start of each block saw tooth wave both line and frame saw tooth waves would also be initiated, and in a two digit system both the line and frame saw tooth waves would be initiated at the same time. The frame or tens signal amplifier 76 is sufficiently biased to prevent message signals and line control signals from altering the current output but the amplifier may amplify the frame and block control signals 36 and 42, which are applied to the tens saw tooth generator 87 to trigger the generator or cause the potential of a tens saw tooth wave to be reduced to the starting point for another wave. The block signal amplifier 77 only amplifies the block control signal 42, which are supplied to the hundreds generator 87 to terminate the block saw tooth waves.

The station initiating the first call in a group would also produce the control signals or impulses in the saw tooth generating devices to modulate the carrier wave. The control impulses from the generators 87 may be supplied over the connection 92 to the modulation amplifier 59. Since carrier wave transmission through the message signal power amplifier 60 is blocked except for recurring periods as determined by the called station radio phone number, the control signals may be fed over the connection 93' to the control signal power amplifier 66 which may be rendered conductive only by the control impulses or signals supplied over connections 92 and 93. Therefore, the control impulses control the transmitting means for transmitting the control impulses or signals.

When the radio station of Figure 7 is employed in a ten party system, the tens equipment 54 and hundreds equipment 55 would not be required and may be disconnected by rotating the switches 94 through 99 to their open positions. Should the station be employed in a one hundred party system the hundreds equipment 55 would not be required and may be disconnected by rotating the switches 95, 97 and 99 to their open position.

When initiating a call to another station it may be desirable to find out whether the called station is busy. First the dials 91 would be set for the number of the desired station. This process would render the power amplifier 60 conductive for transmitting a carrier wave during recurring periods in successive saw tooth waves in accordance with the setting of the dials 91 at the desired station number. Since the receiver is arranged to reproduce received signals only at a definite period of time in accordance with its station call number, I provide a key 100 whereby the electrical conditions representative of the called station number placed on the different connecting leads 65 for controlling the transmitter power amplifier 60 may be temporarily transferred to the receiver power amplifier connecting leads 83 to render the power amplifier 79 conductive during the recurring periods in the successive saw tooth waves, so that the called station may reproduce message signals which correspond to the number indicated by the dials 91. Should the called station be busy then a low frequency wave from the generator 101 may be modulated on the oscillations produced by the oscillator 71 through the key contacts 102. Since the receiver is tuned to receive a carrier wave of a certain frequency transmitted from any station in the group, and the power amplifier 79 may be rendered conductive during recurring periods assigned to the called station corresponding to its call number, a tone representative of the low audio frequency wave from generator 101 may be produced in the loud speaker to indicate a busy condition. If the station called is idle then no carrier would be transmitted during the station's reproducing periods and no intermediate frequency would be produced. Therefore no tone would be produced; whereupon key 100 would be restored and key 67 operated to energize the transmitter oscillator.

The system described above transmits fragments of a message periodically. Should higher fidelity reproductions be desired, I provide a cathode ray tube 103 in the transmitter and another cathode ray tube 104 in the receiver in order that the frequency of the message may be changed or the signals bunched and transmitted in spaced periods of time so that approximately the entire message may be reproduced instead of portions of the message periodically.

The tube 103 is provided with a narrow fluorescent screen 105 near the lower edge of a plate 106 of insulating material, located in one end of the tube, an electron gun in an appropriate pocket in the tube 103 for producing a ray of electrons directed toward the screen, and two sets of electrostatic plates for deflecting the electron ray to cause it to scan the screen. In the opposite end of tube 103 I provide a narrow mosaic 107 mounted on and insulated from a signal plate 108, or a photo electric screen on which a light image of the scene on screen 105 is projected, an electron gun in another appropriate pocket in tube 103 for developing a ray of electrons directed toward the photo electric screen 107 and two sets of deflecting plates for deflecting the electron ray to cause it to scan the screen 107.

The microphones and preamplifier 56 may be connected through switch 58 to the control grid 109 to vary the intensity of the electron ray in accordance with signals produced at the amplifier 56 while being deflected across the fluorescent screen 105. The screen 105 being relatively close to the mosaic 107, the variable density light from a single line on the screen 105 may be projected onto the mosaic 107. The second electron ray may be deflected across the mosaic to develop electrical signals which are fed through the switch 110 to the modulator 59.

Horizontal and vertical deflecting apparatus 111 is provided to deflect the electron ray across the mosaic 107, ten, one hundred or one thousand times faster than the other electron ray is deflected across the fluorescent screen 105, which speed depends upon whether the radio station is one of a ten party or one hundred party or one thousand party system. The deflecting apparatus may be regulated by the units saw-tooth generators 87 over the connection 112 to be more fully explained later.

The tube 104 in the receiver may be like the tube 103, and the deflection of electron rays may be accomplished by apparatus 113, similar to the apparatus 111 except that the rate of deflection of the two electron rays would be reversed; that is, the electron ray deflection across the fluorescent screen would be the faster.

In initiating a call the attendant, after determining through the operation of switch 100 that the desired station is idle, closes key 67 to produce a carrier wave. Key 115 is then closed momentarily to modulate audible frequency from the generator 101 on the carrier to produce a tone in the loud speaker at the called station whereupon the calling station attendant announces station 375 or some other number calling station 510. The called station 510 may then answer by calling station 375, thereby completing two talking paths over two carrier wave channels between the calling and called stations. The transmitting periods for stations 375 and 510 may be intermittent and at different periods in accordance with the stations calling or radiophone numbers. The receiving period for station 375 would be the transmitting period for station 510.

When calling a telephone office the operator establishes a talking path to the calling station by initiating a call for the calling station number. This procedure also verifies the calling station to insure proper charges for billing purposes.

With further reference to Figure 8, the apparatus and associated circuits for producing a series of saw tooth waves and for utilizing these waves to select periods of time for transmitting modulated carrier and to control the selection of received signals for reproduction comprise a set of units equipment 53 having a message distributor 88, saw tooth generator 87, and a message selector 89. Tens and hundreds equipment 54 and 55 are not shown in detail since each equipment is exactly like the equipment 53.

The saw tooth generator 87 comprises a condenser 116 charged through an adjustable resistor 117 from a source of positive potential as indicated.

As the condenser 116 becomes charged, the saw tooth voltage or timing wave in the plate circuit of tube 118 is supplied through adjustable contacts on resistors 119 and 120 to the grids 121, 122 and 123, 124 and 125 of three multi unit tubes 126, 127 and 128.

To initiate the discharge of condenser 116 when the saw tooth voltage applied to the grid 121 in tube 126 increases to a predetermined value, the voltage drop at resistor 129 causes the control electrode 130 of the off and on impulse relay tube 131 to go more negative. This relay tube is described in above mentioned prior application Serial Number 472,105. Instead of the impulse relay tube 131 I may employ a small cathode ray tube having a photo-cell to develop impulses as described in my application Serial Number 451,722 filed July 21, 1942, now Patent No. 2,398,641, granted April 16, 1946. The negative potential on electrode 130, when the saw tooth potential reaches its maximum or predetermined value, rotates the electrons from the anode 132, thereby increasing the potential at anode resistor 133 to cause an impulse of current through transformer winding 134 inducing a current in the secondary winding 135, which current may produce an increase in potential on the grid 136 in tube 126. The increase voltage on grid 136 causes the control electrode 137 in tube 131 to go more negative in order to rotate the electrons from the anode 138, thereby increasing the potential at resistor 139 and causing a voltage impulse to be applied over conductor 140 to the control grid in the trigger tube 118; tube 118 becomes conductive, discharging the condenser 116. This line impulse may also be applied over conductor 92 to the modulator 59 in Figure 7 and over conductor 93 to grid 141 in the power amplifier 66 thus making this grid more positive momentarily to permit the carrier wave, modulated with the positive line control impulse supplied over connection 93′, to be transmitted.

Should another radio station in the group of stations be transmitting, then line control signals would be detected at the second detector 74 and applied to the grid 142 in the unit signal amplifier 75. The grid may be biased so that message signals will not affect the anode output. The line control signals, after suitable amplification in the double unit tube 75, may be applied over conductor 143 to the control grid of trigger tube 118 causing this tube to become conductive to discharge the condenser 116. The received control impulse may also be applied over conductor 144 to the transformer winding 145. The winding 145 is connected in such manner that a control impulse supplied to the winding 145 at the same time that another impulse from tube 131 is supplied to the winding 134 would neutralize each other and no voltage change would be induced in the winding 135. Therefore, no signals would be transmitted through the power amplifier 66. All the saw tooth generators in a group of stations should be adjusted to have as near as possible the same frequency rate. However, the station transmitting with the highest frequency will become the controlling station. The leads 146 and 147 may be connected to the grids in the tens and hundreds signal amplifiers 76 and 77 Figure 7. Thus from the above description it is seen that control signals may be transmitted from only one station at a time in a group.

While I have shown in Figure 8 units equipment only, it is to be understood that in a three digit system as shown in Figure 7 the line frame and block signal may each trigger the units generator to discharge the condenser 116; this procedure will keep all three waves in proper relation to each other since all three will be initiated at the same time or at the termination of each block wave. Likewise in a two digit system, the frame control signal will initiate both the frame and line saw tooth waves at the end of each frame wave.

The grids 122 and 123 in the tube 127 may be variably biased through the different locations of the dial switch 91 to divide each saw tooth wave into different portions, numbered one through ten (ten may be considered naught) to indicate station numbers in a one digit group; see Figure 2. The bias on grid 122 controlled through switch wiper 148 may cause the left unit of the tube 127 to become conductive at the start of a divided portion of the saw tooth wave, which tube may cause the transmitter 49 to start transmitting a portion or fragment of a message, to be presently explained. The bias on grid 123 is one switch step greater than the bias on grid 122 and may be controlled through the wiper 149 which is rotated with 148 to cause the right unit of tube 127 to become conductive at the ending of a selected portion of the saw tooth wave.

As the voltage on grid 122 increases, the left unit of the tube will become conductive at a certain part of the wave depending upon the contact engaged by the wiper 148, whereupon the control electrode 150 in tube 151 becomes more negative to rotate the electrons from the anode 152 thereby increasing or making more positive the potential on grid 153 in tube 154. The grid 153 is sufficiently negative to block current flow through the left unit of tube 154 until the left unit of tube 127 becomes conductive, depending upon the switch position. Therefore the left unit of tube 154 is blocked to current flow until the saw tooth wave has developed to a predetermined value, depending upon the called number.

As the voltage on grid 123 increases, the right unit of the tube 127 will become conductive at a certain part of the wave or at the end of the selected portion of the wave depending upon the contact engaged by the wiper 149. The biases on the grids 122 and 123 are arranged so that the left unit starts conducting at the beginning of a selected portion of the wave and the right unit starts conducting at the end of the same selected portion. The negative voltage applied to the control electrode 155 of tube 156 as a result of the right unit of tube 127 becoming conductive rotates the electrons off the anode 157, thereby causing the electrode 158 to become more positive thus permitting current flow through load resistor 159 to cause the grid 160 to become more negative, thereby blocking current flow through the left unit of the tube 154. Therefore from the above description it is seen that the left unit of tube 154 becomes conductive during only a selected portion of the saw tooth wave. The grid 153 causes the tube to become conductive, and the grid 160 stops or blocks current flow shortly thereafter.

The voltage drop through the resistor 161 during the interval that the left unit of tube 154 is conductive is supplied to the grid 162 to make the grid 163 in the power tube 60 more positive, thus permitting a carrier modulated with message signals to be transmitted for a relatively short period of time corresponding to a selected portion of the saw tooth wave; the grids 164 and 165 may be connected to the tens distributor 88 and the hundreds distributor 88 shown in Figure 7 for a three digit numbered group of stations. In a one digit group the grids 163 and 164 would be connected to the anode outside the tube.

Therefore from the above description it is seen that a message or fragments of a message may be transmitted during any selected portion of the saw tooth wave in a series of successive waves, and further several different stations may be transmitting during different periods in a series of saw tooth waves. By using tens and hundreds equipment the interval of a saw tooth wave may be divided into a greater number of periods so that many more stations may transmit intermittently through the same transmission lane or over carrier waves having like frequencies, but during different periods in a series of saw tooth waves.

The grids 124 and 125 in tube 128 are biased to select a definite portion of each saw tooth wave in a series of successive waves to reproduce received message signals. The assigned call number of the station determines the portion of the saw tooth wave that the receiver will be capable of reproducing received message signals. The bias resistor 166 for the grid 124 is not adjustable for different portions of the saw tooth wave. As the voltage in the saw tooth wave increases, the left unit of tube 128 may become conductive at a definite part of the wave depending on the station assigned radiophone or call number, and the bias on grid 125 may cause the right unit of tube 128 to become conductive at another definite point in the saw tooth wave depending on the duration of a predetermined period of time allotted for the reception of message signals. Saying it another way, the bias resistors 166 and 167 are of such value that the left unit of tube 128 starts conducting at the beginning of a selected portion of the wave and the right unit starts conducting at the end of the selected portion of the wave. The negative voltage applied to the control electrode 168′ of tube 167′ as a result of the left unit of tube 128 becoming conductive causes the electrons to be rotated from the anode 168 to make the grid 169 in tube 170 more positive, thus rendering the left unit of tube 170 conductive.

As the voltage in the saw tooth wave increases, the grid 125 becomes more positive, causing current to flow through the right unit of tube 128 after the left unit has been conductive for one portion of the saw tooth wave. Current flowing through the right unit of tube 128 causes the control electrode 171 in tube 172 to become more negative, thereby rotating the electrons onto the anode 173, thus causing the grid 174 in tube 170 to become more negative to block the current flow through the left unit of tube 170. Therefore it is seen that the left unit of tube 170 may become conductive for only a single portion of the saw tooth wave. The grid 169 causes the left unit of tube 170 to become conductive, and the grid 174 stops or blocks current flow shortly thereafter.

The voltage drop through the resistor 175 during the interval that the left unit of tube 170 is conductive is supplied to the grid 176 decreasing the current through resistor 177, which current is applied through key contacts 178 to the grid 179 thus rendering the power amplifier 79 conductive for the reception of message signals for a relatively short period of time corresponding to the call number of the station. The grids 181 and 182 may be connected through key contacts 183 and 184 to the tens message separator 89 and hundreds separator 89 shown in Figure 7 for three digit numbered group of stations. In a one digit group the grids 181 and 182 may be connected to the anode.

Therefore from the above description it is seen that a message or a fragment of a message may only be reproduced during a definite portion of the saw tooth wave.

The busy key 100 when operated disconnects the grids 179, 181 and 182 in the power tube 79 from the separator circuits and connects them to the corresponding grids in the power tube 60 so that a tone may be produced when a desired station is busy; that is, the potential on the grids 163, 164 and 165 for a desired station or called portion of the saw tooth wave as determined by the dial switch 91 is placed on the grids in the power amplifier 79 so that a carrier broadcast during the called portion of the wave will produce a tone as described in connection with Figure 7.

It is to be understood that the tens and the hundreds equipment 54 and 55 are like the units equipment 53 described above, and that the block saw tooth wave may be divided into ten parts with each part further divided by the tens and unit equipment into one hundred smaller portions to serve one thousand stations. Each equipment units, tens and hundreds is for controlling the potential applied to its associated grid in the power amplifiers 60 and 79 so that all their grids in either power tube must be supplied with relatively high positive potential at the same time in order that the power amplifier may become conductive and that any one of the grids in either power tube upon becoming less positive than a certain value may block or interrupt current flow through that tube.

Referring to Figure 9 I have provided a double cathode ray tube for changing the frequency of message signals. Since there may be three groups of stations of different size, the signals for a message in a group of ten stations may have their frequency increased ten times, for a group of one hundred stations the message signal frequency may be increased one hundred times, and for a group of one thousand stations the frequency of the message signals may be increased one thousand times.

In the cathode ray tube 103 the electron ray in one end of the tube may be deflected across the screen ten, one hundred, or one thousand times faster than the electron ray in the opposite end of the tube is deflected across its associated screen.

The tube 103 may represent the cathode ray tube in the transmitter. Message signals amplified in the preamplifier 56, Figure 7, may be applied to the electrode 109 to vary the intensity of the electron ray directed toward the fluorescent screen 105. The electron ray may be fixed in a vertical position by positive potential supplied through the resistors 185 and 186 to the deflecting plates 187 and 188. The potential on plate 188 may be adjusted through the adjustable load resistor 189, so that the electron ray may be directed toward the lower edge of the plate 106.

To deflect the electron ray back and forward horizontally across the screen 105, I provide a saw tooth generator comprising a condenser 190 charged through an adjustable resistor 191 from a source of positive potential as indicated. As the condenser 190 becomes charged, the saw tooth voltage wave in the plate circuit of trigger tube 192 is supplied through resistor 193 to the grid 194 in multiunit tube 195. The double anode output of amplifier 195 supplied to the load resistors 196 and 197 may change the potential on the horizontal deflecting plates 198 and 199 to affect a forward horizontal movement of the electron ray.

In the opposite end of tube 103, I provide a mosaic 107 directly opposite the fluorescent screen 105 so that the variable density light values in the screen 105 are projected and mosaic 107 to be reproduced at a much higher frequency as previously described. For each forward horizontal deflection of the electron ray on the screen 105 there may be ten, one hundred, or one thousand forward horizontal deflections of the electron ray in the opposite end of the cathode ray tube, but only the last forward deflection or line may be effective to reproduce signals.

To control the horizontal deflection I provide a saw tooth generator comprising a condenser 200 charged through an adjustable resistor 201 from a source of potential as indicated. By movement of the switch 202 other condensers 203 and 204 may be charged to change the deflecting frequency for two and three digit systems. As the condenser 200 becomes charged the saw tooth voltage wave in the plate circuit of trigger tube 205 may be supplied through resistor 206 to the grid 207 in multi unit amplifier 208. The double anode output of the amplifier 208 supplied to the load resistors 209 and 210 may change the potential on the horizontal deflecting plates 211 and 212 to affect a forward horizontal movement of the electron ray. To trigger the generator at the end of each horizontal deflection I provide an off and on impulse tube 213 comprising two control electrodes 214 and 215 connected to the load resistor 210 so that the electrodes 214 and 215 become more negative as the saw tooth voltage increases. As the condenser 200, 203, or 204 becomes charged to a definite value, the potential on the control electrode is decreased sufficiently to rotate the electrons from their associated anodes. As a result the increased potential in load resistor 216 causes a positive impulse to be applied to the grid of trigger tube 205 causing this tube to become conductive thereby discharging condenser 200.

The potential on the vertical deflecting plates may be arranged so that the electron ray will be deflected back and forward above the mosaic 107 for all lines except multiples of the tenth in a ten party system, multiples of the one hundredth line in a one hundred party system, and multiples of the one thousandth line in a one thousand party system. Saying it another way, the mosaic 107 may be scanned in a one, two or three digit system only on the tenth, hundredth, or thousandth horizontal line deflection respectively.

In a ten party system each saw tooth wave may be divided into ten equal portions, as illustrated in Figure 2. Therefore the frequency of the horizontal sweep across the screen 105 may be the same frequency as the saw tooth waves produced in the generator 87 but not necessarily in phase. The frequency of the horizontal deflections in the mosaic end of the tube may be ten times higher.

To control the vertical deflection of the electron ray on and off of the mosaic 107 and to start the horizontal forward movement of the electron ray across the mosaic 107 at the beginning of a certain portion of the saw tooth wave developed in the generator 87, Figure 8, depending upon what station number is called, the grid 122 in amplifier 127 may be connected by the conductor 217 to the grid 218 in amplifier 219. Therefore as the saw tooth voltage increases a voltage drop is applied through the adjustable contacts 220 on resistor 221 to the control electrode 222 in impulse tube 223. The contact 220 may be adjusted so that the electrode 222 will rotate the electrons off of the anode 224 prior to the start of the portion of the wave that has been selected for the transmitter to transmit modulated carrier or the increase in potential on the control electrode 150 Figure 8 lags the rising potential on the control electrode 222. Referring to Figure 2, the numeral 225 may indicate the point on the saw tooth wave ahead of the selected portion 7 in the saw tooth wave where the current through the anode 224 may be interrupted ahead of the current interruptions through the anode 152. The voltage drop on electrode 222 causes the grid 226 in amplifier 227 to go more positive thereby causing the left unit of amplifier 227 to become conductive to increase the potential at the load resistor 228, which potential is applied to the grid in the trigger tube 205 causing this tube to become conductive to discharge the condenser 200. As the saw tooth voltage developed in the circuits of Figure 8 increases to the starting point of a selected portion, which may be portion 7, Figure 2, the grid 229 becomes more negative from tube 151, Figure 8, to block current flow through the left unit of amplifier 227 a short period of time after the left unit of the tube becomes conductive by the positive potential on the grid 226, thereby producing an impulse of relatively short duration. As previously explained the anode 152 in the tube 151, Figure 8, becomes more positive when the saw tooth voltage is increased to the starting point of a selected portion of the saw tooth wave. This voltage is applied to the control electrode 230 to cause a voltage drop through resistor 231, which voltage drop is applied over conductor 232 to the grid 229. Discharging the condenser 200 returns the electron ray horizontally from any location on its associated insulating plate 233 to start another forward deflection, and as presently explained the electron ray may start to scan the mosaic 107 at the start of a selected portion of the wave, which may be portion 7 Figure 2. The left unit of tube 227 being conductive for a short period of time as explained above causes a voltage drop at resistor 234 which voltage drop may be applied to the grid 235 in amplifier 236 causing the grid 237 to go more positive, whereby current may flow through the right unit of tube 236 from a source of potential as indicated to charge the condenser 238 through the adjustable resistor 239. As the condenser 238 becomes charged the voltage in the plate circuit of trigger tube 240 may be supplied through resistor 241 to the grid 242 in the multi-unit amplifier 243. The double anode output of the amplifier 243 supplied to the load resistors 244 and 245 may change the potential on the vertical deflecting plates 246 and 247 to affect a downward movement of the electron ray to the mosaic 107 at the same instant that the impulse through the tube 227 applied to the grid of trigger tube 205 causes the horizontal backward deflection of the ray.

From the above description it has been shown that the electron ray may start its horizontal forward movement across the mosaic at the beginning of a selected portion of the saw tooth wave. At the end of the horizontal deflection of the electron ray across the mosaic 107 three things simultaneously occur: first the tube 205 is triggered from an impulse produced at the load resistance 216 as previously explained, to initiate the horizontal return trace; second, a voltage impulse developed at load resistor 248 is applied over conductor 249 to the grid 250 in multi unit tube 252. As the condenser 238 becomes charged for the selected period in each saw tooth wave the voltage at load resistor 245 goes more positive, which voltage is supplied to the grid 253 in amplifier 252 to allow one impulse in ten occurring on grid 250 to be amplified in the right unit of tube 252. The outpost from the right unit of amplifier 252 may be applied to the grid in the trigger tube 192 to discharge the condenser 190, thereby initiating the horizontal backward movement of the electron ray associated with the screen 105. The potential on grid 253, while condenser 238 is discharged, blocks the tube 252 to signalling impulses. And third, an impulse is produced at the load resistance 248 and applied to the grid of tube 240 to cause this tube to become conductive to discharge the condenser 238 thereby initiating the vertical retrace.

From the above it has been shown that a message may be produced on the screen 105 and picked up from the mosaic 107 in one tenth of the time. For two and three digit systems the frequency ratio would be much higher, and furthermore the reproduction of the signals begins at the start of any selected portion of the wave corresponding to a called station number.

The cathode ray tube 104, Figure 7, for the receiver may be similar to the tube 103 except that the deflecting circuits are reversed to those shown in Figure 9 in that the deflection of the electron ray across the fluorescent screen 105 would be ten, one hundred or a thousand times faster than the deflection of the ray across the mosaic 107. Other differences are switch 255 would be operated to open position and switch 256 would be operated to connect a lead from load resistor 234 to the grid in the right unit of tube 252 so that the condenser 190 is discharged at the same time that condenser 200 is discharged or when the saw tooth voltage increases to a point in the saw tooth wave similar to the point 225 shown in Figure 2, which point may appear ahead of the receiving portion 7 of the saw tooth wave. Leads 217 and 232 would be connected to the grid 124 and load resistor 257 respectively. Therefore it is thought that further explanation is unnecessary.

Refer to Figure 10 showing a radio station 23 and telephone office terminating equipment 26, which may be in the stations 23 in Figure 1. This station may comprise apparatus and associated circuits similar to the station described in Figure 7. As shown in Figure 7, the usual microphone and loud speaker are omitted and the station equipment terminates in a telephone switchboard. Another station in signaling an operator would transmit an audible frequency as previously described, which would be detected in the receiver 22 and applied through the transformer 258 to the alternating current relay 259. The relay 259 may be of any conventional slow acting type to maintain its armature in an operated position during intermittent signal reception to cause the lamp 260 to glow notifying the operator of a waiting call. The operator will connect her cord circuit 261 of conventional type to the jack 262 and listen for the calling party to give his station number, whereupon the operator will operate the dial switch (not shown) in station 23 to call the calling party, as described in connection with Figure 7. The operator may then talk to calling party over the tip conductor 263, low impedance path comprising the condenser 264 and primary winding of transformer 265, to the ring conductor 266. The message signals may be supplied through the transformer 265 to the transmitter 20 for transmitting to the calling station to ascertain the number of a desired telephone subscriber. The operator may then connect the calling plug of her cord to the telephone subscriber's line 267. The operator may initiate a call to any radio station in the group including any mobile stations, in a manner similar to that described for answering a call.

In the various circuits shown and described I have simplified the drawings by indicating the source of potential by a sign. Also I have omitted the heater filaments for the various tubes, but it will be understood that such filaments are necessary.

The embodiments of the invention which have been given herein are illustrations of how the various features may be accomplished and the principles involved. It is to be understood that the invention contained herein is capable of embodiment in many other forms and adaptations, without departing from the spirit of the invention.

Having thus described my invention, I claim:

1. In a communication system, a radio station, means at said station to produce a series of successive saw tooth timing waves, means comprising a multi-position dial switch, and a plurality of electron tubes controlled by said saw tooth waves in accordance with the position of said dial switch to select any one of a number of recurrent periods in said saw tooth waves for the transmission of signals, means to transmit signals representative of a message during said selected recurrent period, and means to receive signals representative of another message during another recurrent period in said saw tooth waves.

2. In a communication system, a plurality of transmitter receiver stations, means at each of said stations to produce a series of successive saw tooth timing waves, means at a first one of said stations comprising a multi-position dial switch, and a plurality of electron tubes controlled by the saw tooth waves produced thereat in accordance with the position of said dial switch to select any one of a number of recurrent periods of time in the said saw tooth waves produced at said first station for the transmission of signals, means at said first station to transmit during said selected recurrent period signals representative of a message to a second one of said stations, and means at said second station to transmit during certain other of said recurrent periods signals representative of another message from said second station to said first station.

3. In a communication system, first and second transmitter receiver stations, means at said first station to produce a series of successive saw tooth timing waves, means comprising a multi-position dial switch, and a plurality of electron tubes controlled by said saw tooth waves in accordance with the position of said dial switch to select a first one of a number of recurrent periods of time in said saw tooth waves for the transmission of signals to said second station, means at said second station for producing a second series of successive saw tooth timing waves in timed relation to the saw tooth waves produced in said first station, means at said second station comprising a second multi-position dial switch, and a plurality of electron tubes controlled by said second series of saw tooth waves in accordance with the position of said second dial switch to select a second recurrent period of time in the said second series of saw tooth waves for the transmission of signals to said first station, and means to transmit signals representative of messages back and forth between said first and second stations during said first and second periods.

4. In a communication system, a plurality of transmitter receiver stations capable of transmitting and receiving signals in spaced periods of time, means at each of the said stations to produce a series of successive saw tooth timing waves, means at each station in a first group of said stations comprising a multi-position dial switch and a plurality of electron tubes controlled by the station saw tooth waves in accordance with the position of the station dial switch to select a number of recurrent periods of time in the saw tooth waves produced at the several stations in the group for transmitting signals to a similar second group of said stations, means at each station in said second group of stations for selecting suitable recurrent periods of time in the saw tooth waves produced at the several stations in said second group of stations whereby signals may be transmitted back and forth between pairs of said stations in different periods.

5. In a communication system, first and second transmitter receiver stations capable of transmitting and receiving signals in spaced periods of time, means at said first station to produce a first carrier wave, means at each of said stations to produce a series of successive saw tooth timing waves, electrical means at said first station to select a first recurrent period of time in said saw tooth waves produced thereat for transmitting said carrier wave only during said first recurrent period, means to transmit signals representative of a message modulated on said carrier wave, means at said second station to produce a second carrier wave having substantially the same frequency as said first carrier wave, electrical means at said second station to select a second recurrent period of time in the said saw tooth waves produced thereat for transmitting said second carrier wave only during said second recurrent period, and means to transmit signals representative of another message on said second carrier wave.

6. In a radio selective communication system, a group of numerically designated transmitter receiver stations each having an identifying number comprising three digits, means at a first one of the said stations to produce a carrier wave, means including a rotatable dial switch at said first station to select a first recurrent period of time representative of the hundred, the ten and the unit digits of the number of a second one of said stations for transmitting said carrier wave during said first recurrent period, means at said first station for transmitting signaling current modulated on said carrier wave to signal the second station, a relay at the second station, said dial switch operable to select a second recurrent period of time to transmit signaling currents modulated on said carrier wave during said second recurrent period to actuate said relay.

7. In a radio communication system, a plurality of transmitter receiver stations, means at each of the said stations for producing a series of saw tooth waves, means at each of the said stations to produce a carrier wave, means at each of the said stations including a dial switch and associated circuits controlled thereby to select a recurrent period of time in its generated saw tooth waves for transmitting one of said carrier waves only during the selected recurrent period, means at said stations to modulate the said carrier waves with signals representative of a number of messages, and means at one of the said stations to produce control signals for maintaining the selection of the recurring periods in all the said stations in proper sequence for transmitting the several messages in successive rotation.

8. In a radio communication system, a calling station, means to produce a first series of saw tooth waves, means comprising a first dial switch and associated circuits controlled thereby to divide the interval of each saw tooth wave into at least two periods, means to produce a first carrier wave, a called station, means including a first electron tube controlled by said circuits to modulate said carrier wave during the first periods in said saw tooth waves with signals representative of a message from the calling station to the called station, means at the called station to produce a second series of saw tooth waves, means at the called station comprising a second dial switch and other associated circuits controlled thereby to divide the interval of each wave in the second series of saw tooth waves into at least two periods, means at the called station to produce a second carrier wave, means including a second electron tube controlled by said other circuits to modulate said second carrier wave during the second periods in the waves of the second series of saw tooth waves, with signals representative of a message from the called station to the calling station.

9. A radio communication system in accordance with claim 8 in which there are provided means for synchronizing the saw tooth waves produced at the called station with the saw tooth waves produced at the calling station.

10. In a communication system, a radio transmitter receiver station, a telephone office transmitter receiver station having an alarm signal device, means at each of the said stations to produce a series of saw tooth waves, means comprising a dial switch and associated circuits controlled thereby at each of the said stations to divide the interval of each of its generated saw tooth waves into at least two periods, means at the said radio station for producing a first carrier wave, means for actuating said signal device from signalling current transmitted over said carrier wave, means at said telephone station for producing another carrier wave, means for transmitting during only one of said periods recurrent in said saw tooth waves signals representative of a message from said radio station modulated on said first carrier wave, and means to transmit during only another of said periods recurrent in said saw tooth waves signals representative of a message from said telephone station modulated on said another carrier wave.

11. In a radio communication system, a plurality of radio stations, means at each of said stations to produce a series of saw tooth waves, means comprising a switch and associated circuits controlled thereby to select a recurrent period of time in said saw tooth waves produced at each of the said stations, means at each of the said stations to produce a carrier wave, means at each of the said stations including an electron tube controlled by said circuits thereat for transmitting its associated carrier wave only during the selected periods at the associated station, means at one of the said stations for modulating control signals on its associated carrier wave to synchronize the said generators, a receiver at each of said stations arranged for the reception of signals during another recurrent period in the said saw tooth waves, and means at each of the said stations for condensing and expanding signals transmitted and received over said carrier waves.

12. In a communication system, a radio station arranged for the transmission and reception of signals in spaced periods of time, means to produce a series of successive saw tooth timing waves including control impulses to terminate each successive wave, means comprising a switch and associated circuits controlled thereby to select any one of a number of periods in each successive wave in said saw tooth waves for the transmission of signals, means under control of said circuits to transmit signals representative of a message during said selected periods, means to transmit said impulses in successive rotation with said signals, and means to receive signals representative of another message during certain other of the said periods.

13. In a communication system, a radio transmitter receiver station capable of transmitting and receiving signals in spaced periods of time, means to produce a series of successive saw tooth timing waves, means to produce a carrier wave, a message distributor comprising a dial switch and other apparatus with associated circuits controlled thereby to select any one of a number of periods in each successive wave in said saw tooth waves for the transmission of said carrier wave in the selected periods, means comprising an electron tube under control of said apparatus and associated circuits to transmit signals representative of a message modulated on said carrier wave, and means to receive signals representative of another message during certain other of the said periods.

14. In a radio communication system, a station arranged for the transmission and reception of signals in spaced periods of time, means to produce a series of successive saw tooth timing waves including control impulses to terminate each wave, means to produce a carrier wave, means comprising a dial switch and associated circuits controlled thereby to select any one of a number of periods in each successive wave in said saw tooth waves for the transmission of said carrier wave in the selected periods, means under control of said circuits to transmit signals representative of a message modulated on said carrier wave, means to transmit said impulses modulated on said carrier wave in successive rotation with said signals, and means to receive signals representative of another message during certain other of the said periods.

15. The communication system in accordance with claim 2 in which there are provided means for synchronizing the saw tooth waves produced at said second station with the saw tooth waves produced at said first station.

16. In a communication system, a first and a second radio transmitter receiver stations each arranged for the transmission and reception of signals in spaced periods of time, means at said first station to produce a series of successive saw tooth timing waves, a message distributor comprising a first electron tube, a first multi-position dial switch to vary the control grid bias supplied to said electron tube and a first pair of relay tubes connected in the output circuits of said electron tube, said electron and relay tubes controlled by said saw tooth waves according to the position of said dial switch to select one of a number of equal periods in each successive wave in the said saw tooth waves for the transmission of signals, means including an amplifier under control of said relay tubes to transmit signals representative of a message to said second station during said selected periods, means at said second station to produce a second series of successive saw tooth timing waves in synchronism with the saw tooth waves produced at said first station, a second message distributor comprising a second electron tube, a second multi-position dial switch to vary the control grid bias supplied to said second electron tube and a second pair of relay tubes connected in the output circuits of said second electron tube, said second electron tube and said second pair of relay tubes controlled by said saw tooth waves according to the position of said second dial switch to select a second one of a number of equal periods in each successive wave in said saw tooth waves produced at said second station for the transmission of signals, said second period adaptable for the reception of signals at said first station, and means including a second amplifier under control of said pair of relay tubes to transmit signals representative of another message from said second station to said first station during said second periods.

17. In a communication system, a radio station comprising a transmitter and a receiver, means to produce a series of successive saw tooth timing waves, means to produce a carrier wave, a message distributor comprising an electron tube, a first multi-position dial switch to vary the control grid bias supplied to said electron tube and a pair of relay tubes connected in the output circuits of said electron tube, said electron and relay tubes controlled by said saw tooth waves according to the position of said dial switch to select a recurrent period of time in said saw tooth waves to transmit said carrier wave only during the selected recurrent period, a telephone office station comprising a transmitter and a receiver, means including an amplifier under control of said relay tubes for transmitting signals modulated on said carrier wave representative of a message to the telephone office station, means in the telephone office station to produce a second carrier wave, means in the telephone office station to produce a second series of successive saw tooth timing waves, means comprising a second multi-position dial switch with apparatus and associated circuits controlled by said second dial switch to select a second recurrent period of time in said second series of saw tooth waves to transmit said second carrier wave only during the second selected period, and means for transmitting signals modulated on said second carrier wave representative of a message to the radio station.

18. In a communication system, a radio transmitter receiver station, a telephone office transmitter receiver station having an alarm signal device, means at each of the said stations to produce at least two series of saw tooth waves, a message distributor at each of said stations comprising a pair of multi-position dial switches and other apparatus with associated circuits controlled by said saw tooth waves to select a recurrent period of time in accordance with coordinate portions of the waves in both of said series of saw tooth waves as determined by the position of said dial switches, means at said radio station for producing a carrier wave, means at said radio station under control of said apparatus and associated circuits thereat to transmit signaling currents modulated on said carrier wave during only said recurrent period to actuate said signal device, means at said radio station following signaling to transmit signals representative of a message to said telephone station during said recurrent period, means in the said telephone station for producing another carrier wave, and means under control of said apparatus and associated circuits at said telephone station to transmit signals representative of a message to said radio station.

19. The communication system in accordance with claim 17 in which there are provided means for synchronizing the saw tooth waves produced at the telephone office station with the saw tooth waves produced at the radio station.

20. In a radio selective communication system having three digit station call numbers, a radio station, units, tens, and hundreds saw tooth generators at said station for producing saw tooth voltages, means including said units generator to produce a series of successive saw tooth waves having different amplitude measurements in each wave numbered one, two and up to indicate the units digit of said call numbers, means including said tens generator to produce a series of successive saw tooth waves having different amplitude measurements in each wave numbered one, two and up to indicate the tens digit of said call numbers, means including said hundreds generator to produce a series of successive saw tooth waves having different amplitude measurements in each wave numbered one, two, three and up to indicate the hundreds digit of said call numbers, and amplitude selecting means comprising a plurality of dial switches, one for each series of saw tooth waves, and associated circuits controlled thereby to coordinate a recurring period of time for a certain amplitude measurement in each series of saw waves, as determined by the position of said dial switches, into a single recurring period of time for the transmission of signals.

21. In a selective radio communication system, a radio station, a plurality of generators at the said station, a first one of said generators for producing successive saw tooth waves with like amplitude measurements in each wave indicating the units digit of radiophone numbers, a second one of said generators for producing successive saw tooth waves with like amplitude measurements in each wave indicating the tens digit of said radiophone numbers, and a third one of said generators for producing successive saw tooth waves with like amplitude measurements in each wave indicating the hundreds digit of said radiophone numbers, and selecting means comprising a plurality of electron tubes and associated circuits controlled by said saw tooth waves to coordinate a recurring period of time for a certain amplitude measurement in each series of saw tooth waves into a single recurring period of time for the transmission of signals.

22. The communication system in accordance with claim 20 in which means are provided to maintain the units, tens, and hundreds saw tooth generators in predetermined time relation.

23. The communication system in accordance with claim 21 in which means are provided for producing control signals to maintain the units, tens, and hundreds saw tooth generators in predetermined time relation.

24. In a radio system, a radio station, generators at said station for producing a plurality of series of saw tooth waves, means for producing a first group of control signals to terminate the saw tooth waves in a first series of said waves, means for producing a second group of control signals to terminate the saw tooth waves in a second series of said waves, and means for producing a third set of control signals to terminate the saw tooth waves in a third series of said waves and the saw tooth waves in both the first and second series of said waves.

25. In a radio system, a radio station, means at said station for producing a plurality of series of saw tooth waves, means for intercepting control signals to terminate said saw tooth waves, said control signals comprising a first set of signals to terminate the saw tooth waves in a first series of said waves, a second set of signals to terminate the saw tooth waves in a second series of said waves and a third set of signals to terminate the saw tooth waves in a third series of said waves and the saw tooth waves in both the first and second series of said waves.

26. In a radio selectve communication system, a group of transmitter receiver stations, means at a first one of said stations to produce a carrier wave capable of reception at all other stations in said group, means at said first station including a member capable of being variably actuated according to the call designation of said stations to individually signal any other station in said group over said carrier wave, and means at said first station including receiver circuits to receive other signals from any station signaled in said group.

27. In a radio selective communication system, a group of transmitter receiver stations, means at a first one of said stations to produce a carrier wave capable of reception at all other stations in said group, means at said first station including a dial switch rotatable according to the call designation of said stations to individually signal any other station in said group over said carrier wave, a second group of transmitter receiver stations means at said first station for adjusting said first means to produce another carrier wave capable of reception at all of the stations in said second group, and utilizing said second means to individually signal any station in said second group over said another carrier wave.

28. In a radio selective communication system, a group of transmitter receiver stations, means at a first one of said stations to produce a carrier wave capable of reception at all other stations in said group, means at said first station including a member capable of being actuated according to the call designation of said stations to individually signal any other station in said group over said carrier wave, means following signaling to modulate said carrier wave with signals representative of a message, and means at said first station including receiver circuits to receive other signals from any station signaled in said group.

29. In a radio selective communication system, a group of transmitter receiver stations, means at a first one of said stations to produce a carrier wave capable of reception at all other stations in said group, means at said first station including a rotatable member capable of being variably rotated according to the call designations of said stations to individually signal any other station in said group over said carrier wave, and means following signaling to modulate said carrier wave with signals representative of a message for the signaled station, means at the signaled station to produce another carrier wave, and means at the signaled station to modulate said another carrier wave with signals representative of a message for said first station.

30. In a radio selective communication system, a radio transmitter station. means at said station to produce at least two carrier waves having relatively wide frequency separation, means to transmit either one of said carrier waves in spaced periods of time, means including a dial switch rotatable according to the call designation of a station to modulate the transmitted carrier wave with signaling currents, and means following signaling to modulate the same carrier wave with signals representative of a message.

31. In a radio communication system, a radio receiver station, means at said station to produce at least two series of successive saw tooth timing waves for controlling the reception of signals, and means to receive signals during a recurrent period of time, said last means comprising a plurality of electron tubes under the joint control of certain portions of the wave in both series of said saw tooth waves.

32. In a radio selective communication system, a group of radio stations each having a number indicating its carrier wave call channel, means at a first one of said stations comprising a multi-position dial switch and suitable circuits controlled thereby to select any one of a number of call channels by its associated station number according to the position of said dial switch for transmitting signals to the selected one of said stations, switch means at said first station to test the selected channel for idle condition, and means following an idle test condition to transmit signaling currents over the selected call channel for signaling the selected station.

33. In a radio selective communication system, a group of radio stations each having a number to indicate its carrier wave call channel, a receiver at each of the said stations to receive signals over its carrier wave call channel for audible reproduction, means at a first one of said stations comprising a multi-position dial switch and suitable circuits controlled thereby to select any one of a number of call channels by its associated number according to the position of said dial switch for transmitting signals to a selected one of said stations, and means at said first station including its receiver to test for an idle or busy condition of the selected station, said receiver utilizing any signals received over the selected call channel to produce a tone, thereby indicating a busy condition of the selected station.

34. In a radio selective communication system, a group of radio stations each having a number to indicate its carrier wave call channel, a receiver at each of the said stations to receive signals over its carrier wave call channel for audible reproduction, means at a first one of said stations comprising a multi-position dial switch and associated circuits controlled thereby to select any one of a number of call channels by its associated number according to the position of said dial switch for transmitting signals to a selected one of said stations, means at said first station including its receiver to test for an idle or busy condition of the selected station, said receiver utilizing any signals received over the selected call channel to produce a tone, thereby indicating a busy condition of the selected station, and means following an idle test condition to transmit signals representative of a message over the selected call channel to the selected station.

35. In a selective communication system, a radio transmitter receiver station, means in said station to produce a series of successive saw tooth waves, means to select a first recurrent period in said saw tooth waves for transmitting signals, said second means including a first amplifier tube having at least one control element under the control of amplitude measurements in the saw tooth waves to render said tube conductive only during said first recurrent period, means in said station to receive signals only during a second recurrent period in the said saw tooth waves, said last means including a second amplifier tube having at least one control element under the control of amplitude measurement in the said saw tooth waves to render said tube conductive only during said second recurrent period, and means to connect the control element in said first tube with the control element in said second tube to utilize any signals received for indicating the busy condition of said first recurrent period.

36. In a radio selective communication system, a mobile radio station having a number to indicate its individual part time carrier wave call channel, a receiver at said station to receive signals over its part time call channel for audible reproductions, means at said station to produce a carrier wave, and means at said station including a multi-position dial switch and suitable circuits controlled thereby according to the position of said dial switch to select any one of a number of other part time carrier wave channels in said carrier wave by its associated number to transmit signals over the selected call channel.

37. In a selective communication system, a radio transmitter receiver station, means in said station to produce a series of successive saw tooth waves including control signals during spaced periods of time, means to select a first recurrent period in said saw tooth waves for transmitting signals, said second means including a first amplifier tube having at least one control element under the control of amplitude measurements in the saw tooth waves to render said tube conductive only during the said first period, means in said station to receive signals only during a second recurrent period in the said saw tooth waves, said last means including a second amplifier tube having at least one control element under the control of amplitude measurement in the said saw tooth waves to render said tube conductive only during said second recurrent period, means to connect the control element in said first tube with the control element in said second tube to utilize any signals received for indicating the busy condition of the said first period, and means at said station to transmit signaling currents during said first recurrent period and said control signals during said spaced periods.

38. In a selective communication system, a radio transmitter receiver station, means in said station to produce a series of successive saw tooth waves, means to select recurrent periods in said saw tooth waves for transmitting signals, said second means including a first amplifier tube having at least one control element under the control of amplitude measurements in the saw tooth waves to render said tube conductive only during the selected periods, and means in said station to receive signals only during certain recurrent periods in the said saw tooth waves, said last means including a second amplifier tube having at least one control element under the control of amplitude measurement in the said saw tooth waves to render said tube conductive only during said certain periods.

39. In a communication system, a radio transmitter station, means at said station to select one of a number of recurrent periods of time in a part time carrier wave channel, means to transmit during the selected periods over said channel signals representative of a message, means to increase the frequency of said signals comprising a cathode ray tube having a first screen and a first electron ray directed toward the screen for recording said signals, and a second screen having only a portion thereof effective for the reproduction of said signals through the action of a second electron ray arranged to be deflected off and on said portion, means to deflect horizontally the first electron ray at a speed substantially different from the speed of the second electron ray, and means to deflect the second electron ray vertically so that the ratio of the effective lines scanned on the second screen to the total horizontal deflections of the second electron ray is equal to the ratio of the speed of the first electron ray to the speed of the second electron ray for reproducing said signals in spaced periods of time.

40. The system in accordance with claim 39 in which there is provided means to synchronize the deflection of the second electron ray across the effective portion of the second screen during the selected periods in the part time carrier wave channel.

41. In a radio communication system, a number of transmitter receiver stations, means at each station including a message distributor and selector with a manually operable member to transmit and receive electrical signals in different recurrent periods of time, generator means at one of said stations to produce synchronizing impulses to control the transmitting and receiving periods thereat, and means at said one station to transmit said impulses for controlling the transmitting and receiving periods in all of the other said stations.

42. The communication system as claimed in claim 41 wherein a second series of control signals may be produced in a second one of said stations, and transformer means in said one station, upon reception of said second series of control signals, to block control signal transmission from said one station.

43. The method of communication comprising the following steps: generating a series of successive timing waves and control synchronizing signals, selecting by station designation a first recurring period of time in the timing waves corresponding to the period assigned to a called station for receiving signals, producing a carrier wave, transmitting the carrier wave during the first recurring period modulated with signalling currents and during a second recurring period modulated with the synchronizing signals, and thereafter transmitting the carrier wave during the first recurring period modulated with signals representative of a message.

44. In a communication system, a sending station, means at said station including a manually operable member capable of being moved to any one of a number of station designated positions to select a recurrent period of time assigned to another station to receive signals, means including a first amplifier coacting with said first means to render the amplifier conductive during said recurrent period to periodically transmit intelligence signals, and means associated with said station including a second amplifier to select a second recurrent period for receiving intelligence signals.

45. In a communication system, a sending station, means at said station including a manually operable member capable of being moved to a number of different station designated positions to produce a train of spaced pulses in each position of said member, each of the said trains of spaced pulses occurring in different periods of time, and means including a first amplifier responsive to one of said trains of pulses, selected according as said member is moved to a position designated for a second station, to periodically render said amplifier conductive to transmit signals for said second station.

46. A communication system according to claim 45, further comprising a receiving station, means at said receiving station including a second amplifier to produce a series of spaced pulses occurring during predetermined periods of time assigned to said station for receiving intelligence signals, and means including a third amplifier responsive to said series of pulses to periodically render said third amplifier conductive to select received signals.

47. In a communication system, means including a calling device capable of being moved accordingly as the number of a called station comprises one, two or three digits to produce a different train of pulses for each digit in the number of a station, and means including an amplifier periodically rendered conductive, in response to a single train of said pulses, or to the joint action of two trains of said pulses, or to the joint action of three trains of said pulses accordingly as said calling device is moved to call a one digit station in a group of not more than ten stations, or a two digit station in a group of not more than one hundred stations, or a three digit station in a group not exceeding one thousand stations, to transmit signals for a called station.

48. In a radio communication system, a mobile station, means at said station including a manually operable member capable of being moved to a number of different station designated positions to produce a train of spaced pulses in each position of said member, each of the said trains of spaced pulses occurring in different periods of time, an oscillator at said station to produce a first carrier wave, means including an amplifier responsive to one of said trains of pulses, selected accordingly as said member is moved to a position designated for a station in a first group of stations, to periodically render said amplifier conductive to transmit signals modulated on said first carrier wave, and means to adjust said oscillator to produce a second carrier wave so that said signals are modulated on said second carrier wave for a similarly designated station in a second group of stations.

49. A communication system according to claim 45, wherein said second station is located in a telephone office, and means including suitable circuits at said telephone office to provide a communication path between said sending station and a wire line telephone subscriber's station.

50. In a communication system, a radio station, means at said station including a first amplifier having a control grid adapted to be variably biased to produce different trains of spaced pulses, each of the said trains of spaced pulses occurring in different periods of time, and means including a second amplifier responsive to one of said trains of pulses, selected according to the bias on said control grid, to periodically render said second amplifier conductive to transmit or receive signals.

51. In a communication system, a plurality of transmitter-receiver stations, means at each of the said stations to produce a carrier wave, means at each of the said stations to produce a series of saw tooth waves, means associated with each of the said stations comprising a multi-position station calling device and suitable circuits controlled by the said saw tooth waves produced thereat in accordance with the position of its associated station calling device for selecting a different recurring period of time at each of the said stations to transmit the said carrier waves in said recurring periods modulated with signals representative of two-way messages between different pairs of said stations.

52. In a radio communication system, a plurality of numerically designated transmitter stations, means at a first one of said stations to produce a carrier wave capable of reception at all of the other said stations, means at said first station to produce a series of successive saw tooth timing waves, a message distributor at said first station comprising a multi-position dial switch having each position thereof designated for a different one of said stations and a plurality of electron tubes controlled by said saw tooth waves in accordance with the position of said dial switch to select a recurrent period of time to transmit said carrier wave for reception at a second one of said stations, said second station designated to correspond to the designation at the position of said dial switch and provided with a signal alarm member, and means at said first station including an amplifier to modulate said carrier wave with signaling currents to actuate said alarm member at said second station.

53. In a selective wireless communication system, a plurality of different carrier wave groups of transmitter-receiver stations, each of the said stations in a group being identified by a number comprising a prefix to indicate its associated group or carrier wave and one or more digits to indicate a recurring period of time for the reception of signals over its associated group carrier wave, means at a first one of said stations to produce a carrier wave according to the prefix in the number of a second one of said stations, means at said first station to produce saw tooth waves, means at said first station comprising a multi-position dial switch having each position thereof designated by the digits in the number of a different one of said stations and a plurality of electron tubes controlled by said saw tooth waves in accordance with the position of said dial switch at the number of said second station to select a recurrent period of time to transmit said carrier wave for reception at said second station, and means at said first station including an amplifier to modulate said carrier wave with signaling currents to signal said second station.

54. In a radio selective communication system, a plurality of numerically designated transmitter-receiver stations, each of the said stations having an identifying number comprising at least three digits, means at a first one of said stations to produce a carrier wave, means at said first station to produce three series of saw tooth waves, means at said first station under joint control of said three series of saw tooth waves to select a recurring period of time, representative of a three digit station number for a second one of said stations, to transmit said carrier wave for reception at said second station, and means at said first station including an amplifier to modulate said carrier wave with signaling currents to signal said second station.

55. In a communication system, a first radio transmitter-receiver station, means at said station to produce a carrier wave, means at said station to produce a first series of saw tooth waves, means at said station comprising a multi-position calling device and associated circuits under control of said saw tooth waves according to the position of said calling device to select a first recurrent period of time to transmit signaling currents modulated on said carrier wave, a telephone office radio transmitter-receiver station having a signal alarm member, means associated with said telephone office station to produce a second series of saw tooth waves in synchronism with said first series of saw tooth waves, and means associated with said telephone office station including a relay, and suitable circuits under control of said second series of saw tooth waves to select a recurrent period corresponding to said first recurrent period for the reception of said signaling currents to actuate said relay thereby actuating said alarm member.

56. A communication system according to claim 55 and further comprising means and suitable circuits at said telephone office to provide a communication path between said radio station and a wire line telephone subscriber's station.

JOHN H. HOMRIGHOUS.

REFERENCES CITED

The following references are of record in the file of this patent:

UNITED STATES PATENTS

| Number | Name | Date |
|---|---|---|
| 1,910,960 | Nebel | May 23, 1933 |
| 1,982,771 | Ardenne | Dec. 4, 1934 |
| 2,007,809 | Nicolson | July 9, 1935 |
| 2,021,743 | Nicolson | Nov. 19, 1935 |
| 2,036,350 | Montani | Apr. 7, 1936 |
| 2,048,081 | Riggs | July 21, 1936 |
| 2,146,876 | Zworykin | Feb. 14, 1938 |
| 2,172,354 | Blumlein | Sept. 12, 1939 |
| 2,236,015 | Sonnentag | Mar. 25, 1941 |
| 2,256,336 | Beatty | Sept. 16, 1941 |
| 2,262,838 | Deloraine et al. | Nov. 18, 1941 |
| 2,263,369 | Skillman | Nov. 18, 1941 |
| 2,265,216 | Wolf | Dec. 9, 1941 |
| 2,272,070 | Reeves | Feb. 3, 1942 |
| 2,272,613 | Phelps | Feb. 10, 1942 |
| 2,275,224 | Henroteau | Mar. 3, 1942 |
| 2,277,516 | Henroteau | Mar. 24, 1942 |
| 2,282,046 | Goldsmith | May 5, 1942 |
| 2,298,562 | Henroteau | Oct. 13, 1942 |
| 2,367,277 | Henroteau | Jan. 16, 1945 |
| 2,403,210 | Butement et al. | July 2, 1946 |
| 2,406,165 | Schroeder | Aug. 20, 1946 |
| 2,418,116 | Grieg | Apr. 1, 1947 |
| 2,421,017 | Deloraine et al. | May 27, 1947 |
| 2,437,027 | Homrighous | Mar. 2, 1948 |

FOREIGN PATENTS

| Number | Country | Date |
|---|---|---|
| 553,393 | Great Britain | May 19, 1943 |

OTHER REFERENCES

Review of Scientific Instruments, February 1941 issue, pages 102 and 103.